(12) United States Patent
Huang

(10) Patent No.: US 6,837,114 B2
(45) Date of Patent: Jan. 4, 2005

(54) THREE-DIMENSIONAL MEASURE DEVICE WITH AIR BEARINGS

(75) Inventor: Han Chang Huang, Taichung (TW)

(73) Assignee: Carmar Technology Co., Ltd., Taichung (TW)

(*) Notice: Subject to any disclaimer, the term of this patent is extended or adjusted under 35 U.S.C. 154(b) by 20 days.

(21) Appl. No.: 10/392,913

(22) Filed: Mar. 21, 2003

(65) Prior Publication Data
US 2004/0182176 A1 Sep. 23, 2004

(51) Int. Cl.⁷ ................................................. G01D 7/00
(52) U.S. Cl. .................. 73/862.041; 73/862; 73/862.07
(58) Field of Search ........................... 73/862, 862.041, 73/862.07

(56) References Cited

U.S. PATENT DOCUMENTS

| 4,250,530 A | * | 2/1981 | Yang | 360/246.1 |
| 4,433,571 A | * | 2/1984 | Snow, Jr. | 73/37.5 |
| 4,882,847 A | * | 11/1989 | Hemmelgarn et al. | 33/503 |
| 6,586,072 B1 | * | 7/2003 | Renault | 428/116 |

* cited by examiner

Primary Examiner—Edward Lefkowitz
Assistant Examiner—Alandra Ellington
(74) Attorney, Agent, or Firm—Rosenberg, Klein & Lee

(57) ABSTRACT

A three-dimensional measure device with air bearings includes a base member having a platform horizontally securely thereon. A bridge is slidably mounted on the platform and moved along a first dimension. The bridge includes a first support and a second support respectively supporting a horizontal portion of the bridge. A runner is slidably mounted on the horizontal portion and moved along a second dimension. A tubular shaft is reciprocally and moved received in the runner and moved along a three dimension. A probe is longitudinally movably received in the tubular shaft. The air bearings are mounted between two adjacent elements that are moved relative to each other. Each air bearing has a resilient member mounted and previously compressed therein to provide an act force to the air bearing for adjusting a gap between the two adjacent elements that are moved relative to each other.

2 Claims, 5 Drawing Sheets

THREE-DIMENSIONAL MEASURE DEVICE WITH AIR BEARINGS

BACKGROUND OF THE INVENTION

1. Field of the Invention

The present invention relates to a three-dimensional measure device, and more particularly to a three-dimensional measure device with air bearings in which a resilient member is mounted and previously compressed.

2. Description of Related Art

A conventional three-dimensional measure device in accordance with the prior art shown in FIG. 5 comprises base member (7) and a platform (71) securely mounted on the base member (7). A bridge (72) is slidably mounted on the platform (71) and moved along a first dimension of the three-dimensional measure device. The platform (71) has a guider (711) secured on one side of the platform (71) to guide and limit the moving direction of the bridge (72). A first support (721) and a second support (722) respectively and perpendicularly connected to two opposite ends of the bridge (72) for horizontally supporting the bridge (72). The first support (721) has a free end perpendicularly slidably moved on the platform (71) and corresponding to the guider (711). The second support (722) has a free end perpendicularly slidably moved on the platform (71). The first support (721) and the second support (722) respectively correspond to two opposite sides of the platform (71). A runner (73) is slidably mounted on the bridge (72) and moved along a second dimension of the three-dimensional measure device. A tubular shaft (74) is telescopically received in the runner (73) and perpendicularly toward the platform (71). The tubular shaft (74) is moved along a third dimension of the three-dimensional measure device. A probe (75) is slightly movably received in the tubular shaft (74). Multiple air bearings (8) are mounted in the free ends of the first support (721) and the second support (722), and the runner (73) for reducing friction and measuring inaccuracy.

With reference to FIG. 6, the air bearing (8) includes a body (81) having a bottom (811) facing a plane of a comparatively moving object. A cavity (812) is defined in a top surface of body (81) and has a hemisphere shape. An outlet passage (813) is radially defined in the body (81) relative to the hemisphere cavity (812). The outlet passage (813) extends to the bottom (811) of the body (81) and communicates with the hemisphere cavity (812). A block (82) is partially received in the hemisphere cavity (812) for loading the gravity of the bridge (72)/the runner (73). The shape of the block (82) corresponds to that of the hemisphere cavity (812). An inlet passage (821) is defined in and extends through the block (82). The inlet passage (821) communicates with the outlet passage (813). A high-pressure air current flows through the inlet passage (821) and the outlet passage (813) to the bottom (811) of the body (81) such that a gap (h1) is formed between the free end of the supports (721, 722) and the platform (71) for reducing friction and easily moving the bridge (72).

The three-dimensional measure device is a very precise machine such that the gap (h1) must be controlled in a certain range with 3 $\mu$m. However, the expansion coefficients of the elements of the three-dimensional measure device are different to one another. Consequently, the temperature of the operational environment of the three-dimensional measure device is controlled about 20° C.±1° C. to prevent the three-dimensional measure device from an inaccuracy due to a change of the temperature of the operational environment and the expansion coefficients of the elements of the three-dimensional measure device. In case of power failure, the range of the gap (h1) may be changed and influence the precision of the three-dimensional measure device. For a better measure effect, the three-dimensional measure device needs to be checked when the power is supplied again. It is very inconvenient.

The present invention has arisen to mitigate and/or obviate the disadvantages of the conventional three-dimensional measure device.

SUMMARY OF THE INVENTION

The main objective of the present invention is to provide an improved three-dimensional measure device with multiple air bearings in which a resilient member is mounted and previously compressed.

To achieve the objective, a three-dimensional measure device with air bearings in accordance with the present invention comprises a base member having a platform horizontally securely thereon. A bridge is slidably mounted on the platform and moved along a first dimension. The bridge includes a first support and a second support respectively supporting a horizontal portion of the bridge. A runner is slidably mounted on the horizontal portion and moved along a second dimension. A tubular shaft is reciprocally and moved received in the runner and moved along a three dimension. A probe is longitudinally movably received in the tubular shaft. The air bearings are mounted between two adjacent elements that are moved relative to each other. Each air bearing has a resilient member mounted and previously compressed therein to provide an act force to the air bearing for adjusting a gap between the two adjacent elements that are moved relative to each other.

Further benefits and advantages of the present invention will become apparent after a careful reading of the detailed description with appropriate reference to the accompanying drawings.

DETAILED DESCRIPTION OF THE INVENTION

Figure 1:
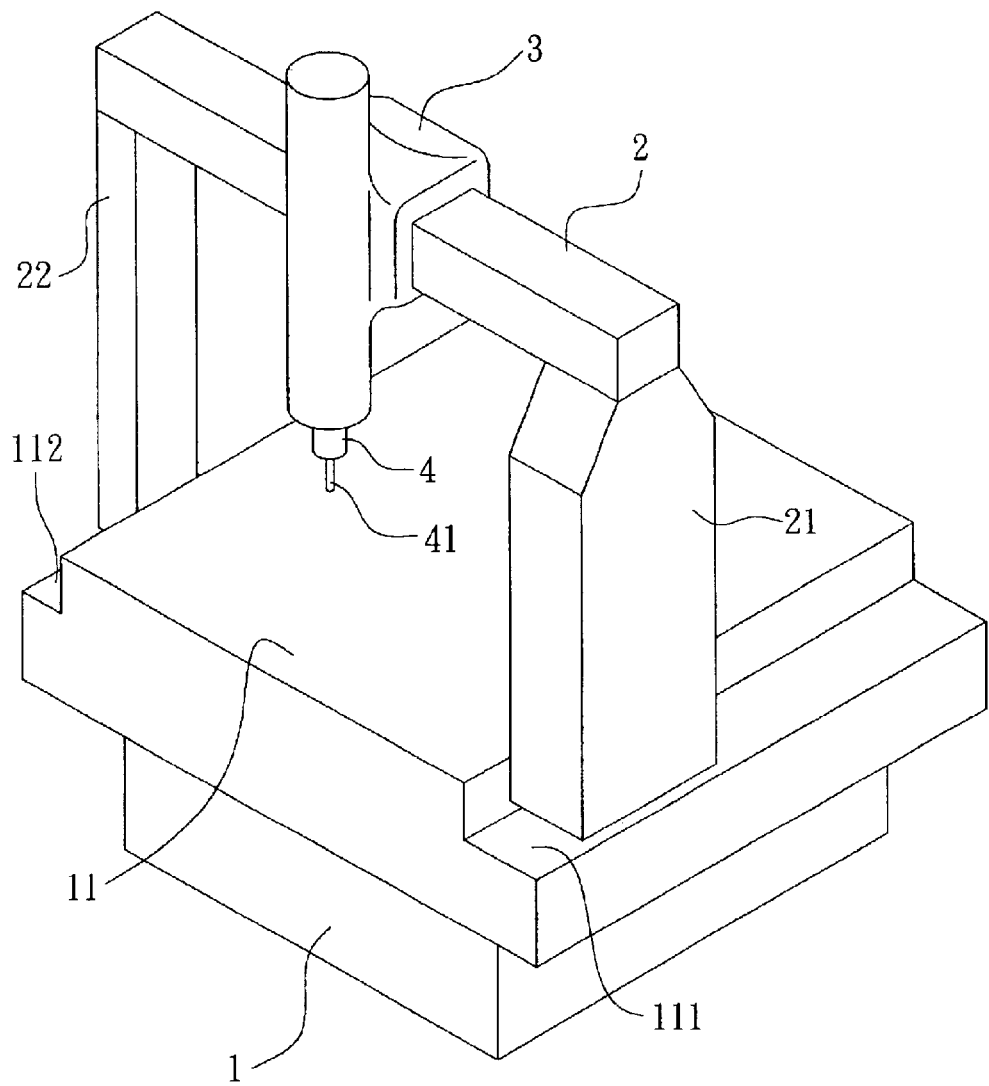
FIG. 1 is a perspective view of a three-dimensional measure device in accordance with the present invention.
Figure 2:
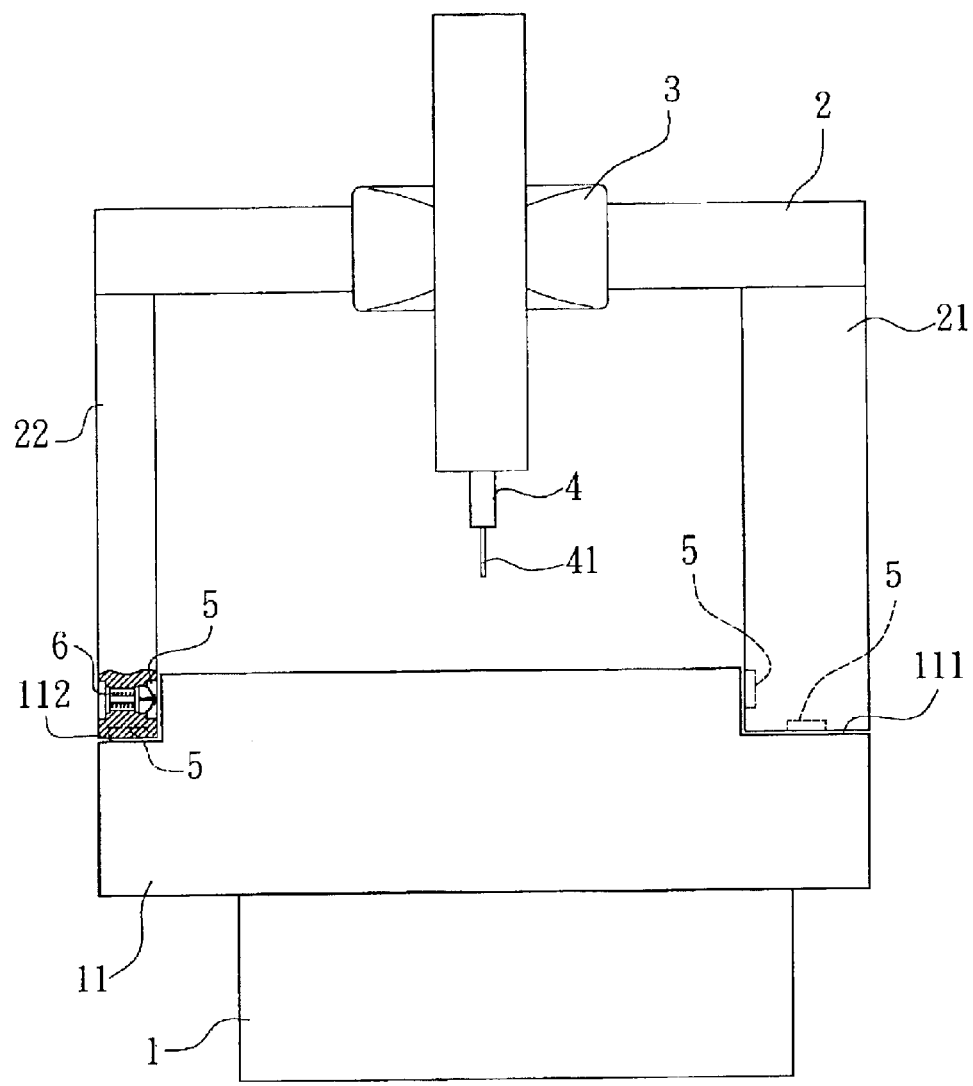
FIG. 2 is a front plan view in partial section of the three-dimensional measure device in FIG. 1.
Figure 3:
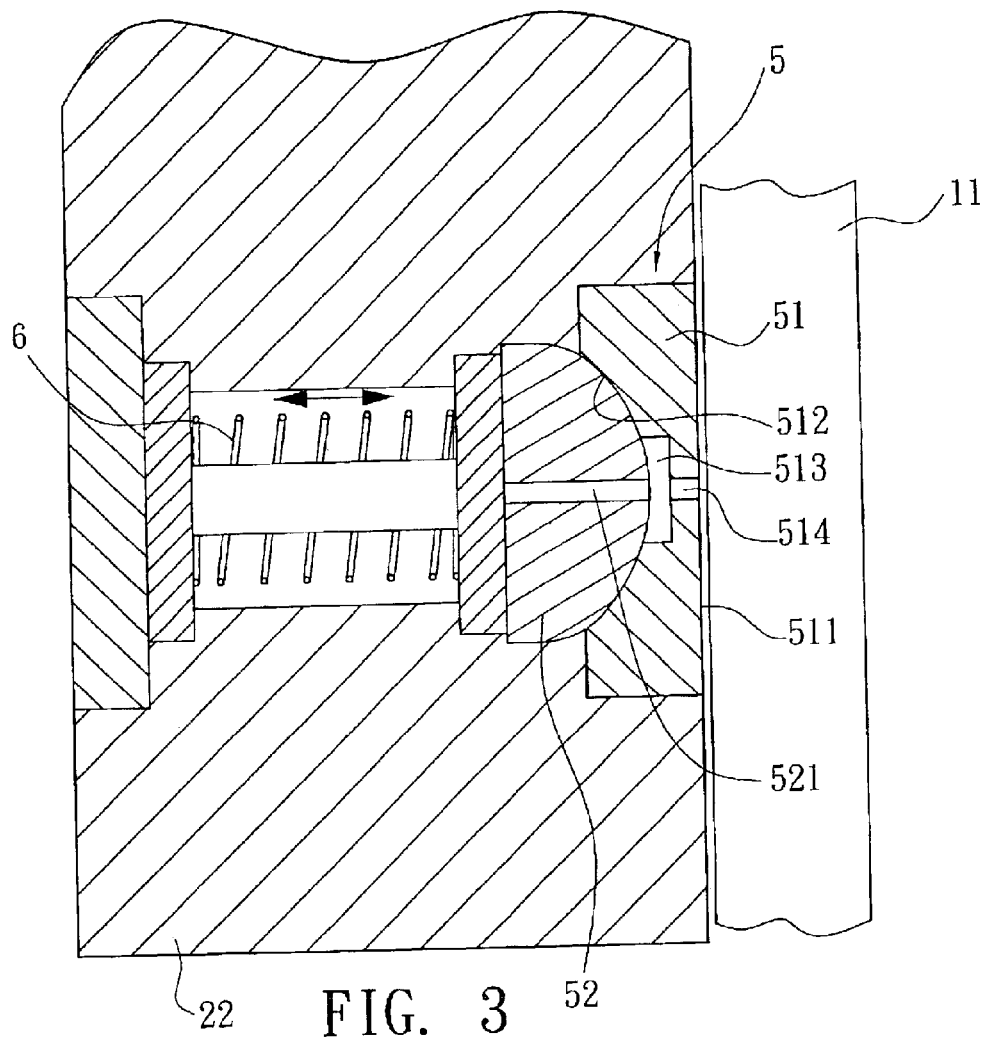
FIG. 3 is a cross sectional view of an air bearing of the three-dimensional measure device in FIG. 2.
Figure 4:
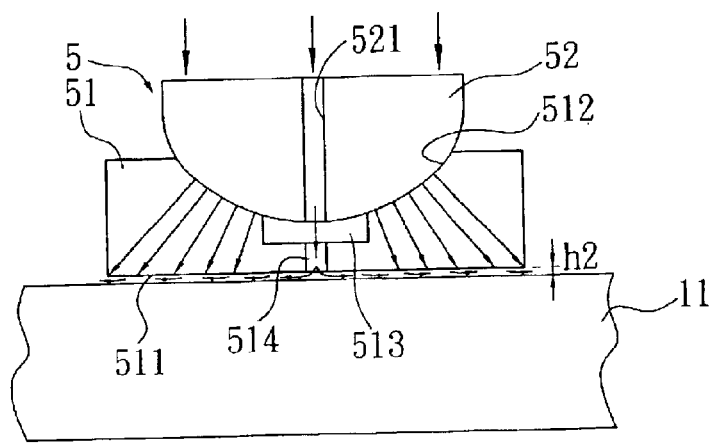
FIG. 4 is a plan view of the air bearing of the three-dimensional measure device of the present invention.
Figure 5:
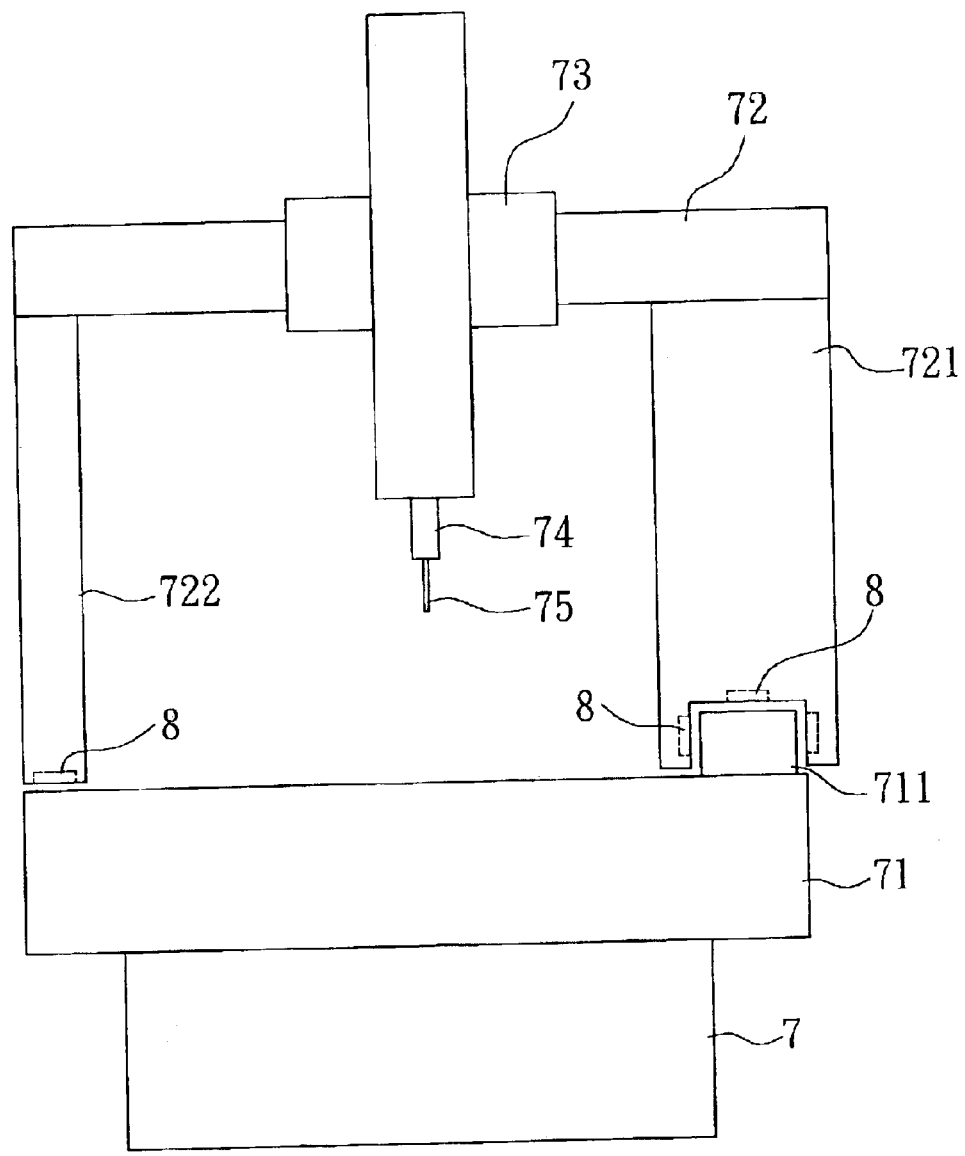
FIG. 5 is a front plan view of a three-dimensional measure device in accordance with the prior art.
Figure 6:
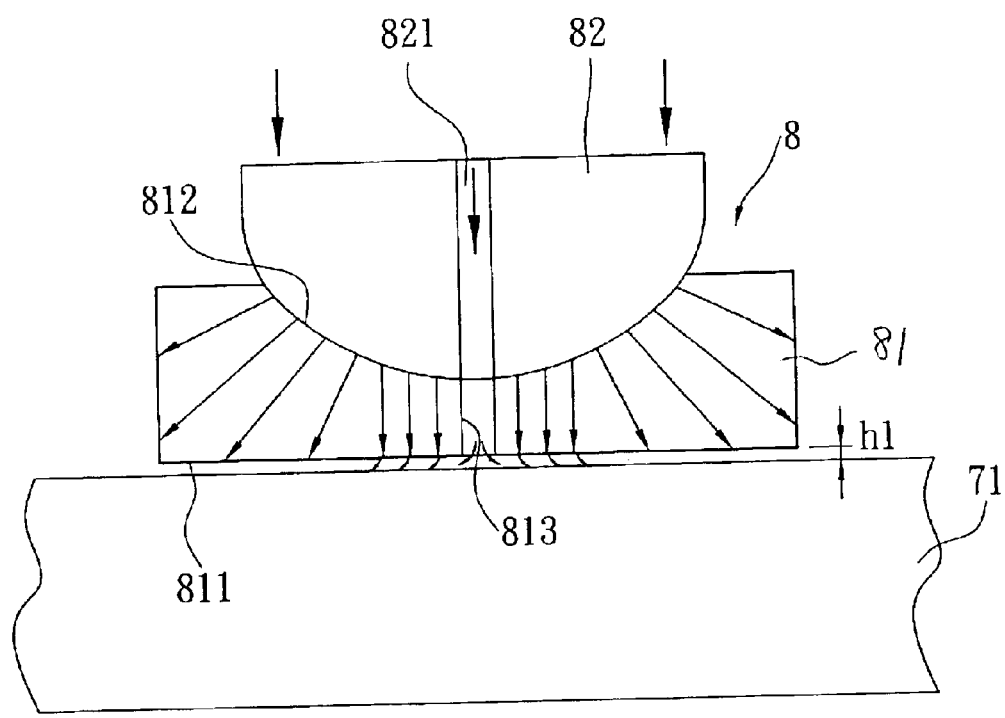
FIG. 6 is a plan view of an air bearing of the conventional three-dimensional measure device in FIG. 5.

Referring to the drawings and initially to FIGS. 1–4, a three-dimensional measure device in accordance with the present invention comprises base member (1), a bridge (2) slidably mounted on the base member (1), a runner (3) slidably mounted on a horizontal portion of the bridge (2) and a tubular shaft (4) perpendicularly movable received in the runner (3). The bridge (2) is moved along a first dimensional of the present invention, the runner (3) is moved along a second dimensional of the present invention and the tubular shaft (4) is moved along a third dimensional of the present invention.

The base member (1) includes a platform (11) horizontally secured on a top surface of the base member (1). The platform (11) includes a first side having a first channel (111) defined in the platform (11) and a second side having a second channel (112) defined in the platform (11). The first channel (111) and the second channel (112) are parallel to each other.

The bridge (2) has a first support (21) and a second support (22) respectively horizontally supporting the horizontal portion of the bridge (2). The first support (21) has a first end slidably moved in the first channel (111) and a second end connected to a first end of the horizontal portion. The second support (22) has a first end slidably moved in the second channel (112) and a second end connected to the horizontal portion of the bridge (2). The tubular shaft (4) has a probe (41) longitudinally and moved received in the tubular shaft (4).

For reducing the friction between elements, there are multiple air bearings (5) mounted between the platform (11) and the bridge (2), the bridge (2) and the runner (3) and the runner (3) and the tubular shaft (4). The air bearing (5) comprises body (51) with a bottom (511) facing a flat surface of an adjacent element. A hemisphere-like cavity (512) is defined in the body (51) opposite to the bottom (511) and a recess (513) is defined in a bottom of the hemisphere-like cavity (512). An outlet (514) is defined in the body (51). The outlet (514) extends to the bottom (511) of the body (51) and communicates with the recess (513). A block (52) is partially received in the hemisphere-like cavity (512) and has a lower side with a shape corresponding to that of the hemisphere-like cavity (512). The block (52) is provided to load the gravity of the element in which the air bearing (5) mounted. An inlet (521) is defined in the block (52) and extending through the block (52). The inlet (521) communicates with the recess (513) after extending through the block (52). A resilient member (6) is previously compressively mounted in each of the multiple air bearings (5). In the preferred embodiment of the present invention, the resilient member (6) is a spring. The resilient member (6) is previous compressed and has a pressure that is previous set such that the block (52) always loads an act force from the resilient member (6).

As described above, a gap (h2) is formed between the bottom (511) of the body (51) and the adjacent element when the compressed air flows to the bottom (511) of the body (51) via the inlet (521) in the block (52), the recess (513) in the body (51) and the outlet (514) in the body (51) to reduce the friction between the two adjacent elements that are moved relative to each other.

The resilient member (6) can adjust the gap (h2) and absorb the deformed range of the two adjacent elements that are moved relative to each other when the two adjacent elements expand when hot or shrink when cold due to the elasticity of the resilient member (6). Consequently, the precision of the three-dimensional measure device in accordance with the present invention does not be changed due to the variables of the surroundings. Furthermore, with reference to FIG. 4, the gravity loaded by the air bearing (5) is averagely dispersed to the bottom of the hemisphere-like cavity (512) because the recess (513) is centrally defied in the bottom of the hemisphere-like cavity (512). Consequently, the air bearing (5) in accordance with the present invention can provide a better supporting force.

Although the invention has been explained in relation to its preferred embodiment, it is to be understood that many other possible modifications and variations can be made without departing from the spirit and scope of the invention as hereinafter claimed.

What is claimed is:

1. A three-dimensional measure device comprising:
    a plurality of air bearings;
    a base member including a platform horizontally secured thereon;
    a bridge slidably mounted on the platform and movably positioned thereon along a first dimension of the three-dimensional measure device, the bridge including a first support and a second support respectively supporting a horizontal portion of the bridge;
    a runner slidably mounted on the horizontal portion of the bridge and movably along a second dimension of the three-dimensional measure device;
    a tubular shaft reciprocally and movably received in the runner and positionable along a third dimension of the three-dimensional measure device, said first and second and third dimensions being orthogonal with respect to each other; and,
    a probe longitudinally movable and received in the tubular shaft;
    a resilient member mounted and previously compressed in each of said plurality of air bearings to provide a biasing force on the air bearing for adjusting a gap between the two adjacent elements that are moved relative to each other,
    wherein each of said plurality of air bearings is mounted between said two adjacent elements movably positioned with respect to each other, each of said plurality of air bearings further comprising:
        a body with a bottom facing a flat surface of an adjacent element that is movable relative to the air bearing;
        a hemisphere-like cavity defined in the body opposite to the bottom of the body;
        a recess defined in a bottom of the hemisphere-like cavity;
        an outlet defined in the body, the outlet extending to the bottom of the body and communicating with the recess in the body;
        a block partially received in the hemisphere-like cavity and having a lower side with a shape corresponding to that of the hemisphere-like cavity, the block being adapted to load a weight of the adjacent element in which the air bearing is mounted; and,
        an inlet defined in the block and extending through the block, the inlet communicating with the recess after extending through the block and allowing compressed air to flow to the bottom of the body via the inlet, the recess and the outlet.

2. The three-dimensional measure device as claimed in claim 1, wherein said platform comprises:
    a first side having a first channel defined in the platform for slidably receiving a free end of the first support of the bridge; and,
    a second side having a second channel defined in the platform for slidably receiving a free end of the second support of the bridge.

* * * * *